Patented Nov. 3, 1942

2,300,600

UNITED STATES PATENT OFFICE 2,300,600

METHOD OF ACTIVATING CARBON

James E. Steely, Roy E. Swartz, and Dmitry S. Troubs, Covington, Va., assignors to West Virginia Pulp and Paper Company, New York, N. Y., a corporation of Delaware No Drawing. Application July 7, 1939,
Serial No. 283,226

6 Claims. (Cl. 252—278)

Our present invention relates to an improved method of activating carbon whereby a purer, more active and more uniform product is produced. More especially, it relates to the activation of that type of carbon known as black ash residue or leacher refuse obtained from the burning of so-called black liquor, which in the manufacture of pulp is the liquor remaining after the wood or other cellulose-containing material has been cooked and the cellulose separated out. Such liquor contains the non-cellulosic organic matter of the wood, as modified by the cooking operation, mineral salts originally present in the wood, as well as the inorganic salts left over from the cooking liquor. After separation of the cellulose the liquor is concentrated and burned under conditions in which the organic constituents are in large part carbonized. The resulting product, termed black ash, is leached to dissolve out the salts which it contains, which after suitable treatment are re-used in the cooking operation. After leaching, the residue or so called leacher refuse consists of crude carbon which is susceptible to a high degree of activation.

The activation process commonly involves heating the material to a temperature which in general may vary from 500° to 2500° F. and under conditions which are usually, although not necessarily, oxidizing. Following the activation step, the carbon is sometimes treated with water or dilute acid to reduce the mineral content.

In carrying out the process as above outlined the difficulty has often been experienced in obtaining a product which is uniform in its degree of activation. Particularly is this difficulty present where leacher refuse has been allowed to accumulate over a long period during which it has been exposed to the weather, in which case it was found that the weathered layers are more easily activated than the non-exposed layers. After considerable experimentation we have discovered that non-uniformity of results in the activation is due to the effect of the mineral residues which are not removed in the leaching operation above described. Not only do these mineral residues decrease the activity of the final product, but in the attempt to secure a greater activation a considerable wastage of the carbon results. Furthermore, these mineral residues are firmly bound to the carbon and resist removal by washing with ordinary acids.

We have now found that it is possible to remove the mineral content of the leacher refuse to a point which will enable a high and uniform degree of activation to be had by the usual methods of heat treatment. In carrying out our improved method we subject the leacher refuse to a heat treatment or calcination at a temperature which may vary over a considerable range, e. g., from 500° F. to in excess of 1750° F., although temperatures much higher than 1750° F. should not be used, since a negative effect may be had, possibly by fusion of the salts at such higher temperatures with consequent firmer bonding of the salts to the carbon. Preferably the calcination is carried out in a direct fired rotary kiln in which part of the carbon is oxidized to furnish the heat of calcination, although the invention is not limited to this form of heating, as other forms may be used. Moreover, carrying out the calcination in the presence of air to bring about combustion of some of the charge is found to give somewhat better results than heating without access to air, although satisfactory results have been obtained without air being present, in which case the heat is supplied exteriorly to the chamber in which the carbon is being treated. Some activation of the crude carbon also results in this step. Other types of furnaces may be used for the calcination, as for example, the multiple hearth or Wedge type.

The hot calcined product is preferably allowed to drop from the kiln into a vat containing water in which it is quenched, although other means for cooling the carbon may be employed. After the carbon has been thus quenched it may be conveyed in the form of a water slurry to a further tank in which the carbon is washed with a dilute solution, preferably in distilled water, of mineral acid preferably of not over 1% strength. Acids suitable for the purpose are sulfuric, sulfurous, hydrochloric, nitric, etc. The strength of the washing acid used is not critical. For some purposes leaching with water alone is sufficient.

By proceeding in the manner above described, leacher residue which originally had an ash content varying, say, from 25% to 7% is readily reduced in ash content so that the latter is between 1% and 2%, and desirably not over 3%. The exact nature of the calcination reaction is unknown to us at this time, although experimental work indicates that the principal action of the heat is to break down the affinity between such salts and the carbon.

Having thus reduced the ash content of the leacher refuse to a desired value, depending upon the degree of activation subsequently to be given the material, it is then activated in the usual way, as by heating in a suitable furnace from 500° to 2500° F., preferably under oxidizing conditions.

This activation step may be followed by further leaching if activated carbon having an extremely low ash content is desired.

If it is attempted to activate certain types of leacher refuse having a high ash content, a degree of activation represented by a molasses value of 70 is obtained, whereas if the carbon be calcined as described followed by leaching so as to reduce the ash content to below 2½%, a molasses value may be obtained upon subsequent activation of 450 for the same activation treatment.

We claim:

1. In the activation of leacher refuse having an ash content in excess of 3%, the improvement which consists in first removing said ash content to below 3% by calcining said refuse to a temperature in excess of 500° F. but below the temperature at which the ash content fuses, thereby weakening the bond between said ash and the carbon so as to permit of its substantial removal by aqueous extraction, then subjecting the cooled calcined material to aqueous extraction and carrying out in known manner the activation of the ash-poor carbon by heat and oxidation.

2. The method according to claim 1, in which calcination is carried out in an oxidizing atmosphere.

3. The method according to claim 1, in which the calcination is carried out by effecting a partial oxidation of the carbon substance.

4. The method according to claim 1, in which the extraction is carried out by leaching with dilute mineral acid.

5. The method according to claim 1, in which the crude hot leacher refuse from the calcination step is quenched prior to the extraction step.

6. In the activation of leacher refuse having an ash content in the range substantially 7% to 25%, the improvement which consists in first removing said ash content to below 3% by calcining said refuse to a temperature in excess of 500° F. but not in excess of a temperature above 1750° F. at which the ash content fuses, thereby weakening the bond between said ash and the carbon so as to permit of its substantial removal by aqueous extraction, then subjecting the cooled calcined material to aqueous extraction and carrying out the activation of the ash-poor carbon by heat and oxidation.

JAMES E. STEELY.
ROY E. SWARTZ.
DMITRY S. TROUBS.